US011565670B2

United States Patent
Richard et al.

(10) Patent No.: US 11,565,670 B2
(45) Date of Patent: Jan. 31, 2023

(54) AIRCRAFT WHEEL BRAKING SYSTEM, CONFIGURABLE TO OCCUPY A NORMAL MODE OR AN RTO MODE

(71) Applicant: SAFRAN LANDING SYSTEMS, Velizy Villacoublay (FR)

(72) Inventors: Nathanaël Richard, Moissy-Cramayel (FR); Romain Presle, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 387 days.

(21) Appl. No.: 16/837,020

(22) Filed: Apr. 1, 2020

(65) Prior Publication Data

US 2020/0307531 A1    Oct. 1, 2020

(30) Foreign Application Priority Data

Apr. 1, 2019  (FR) ..................... 19 03459

(51) Int. Cl.
*B60T 8/17* (2006.01)
*B60T 8/172* (2006.01)
(Continued)

(52) U.S. Cl.
CPC ............ *B60T 8/1703* (2013.01); *B60T 8/172* (2013.01); *B60T 8/325* (2013.01); *B60T 13/746* (2013.01); *B64C 25/44* (2013.01); *B60T 2250/04* (2013.01)

(58) Field of Classification Search
CPC ........ B60T 8/1703; B60T 8/172; B60T 8/325; B60T 13/746; B60T 2250/04; B64C 25/44
See application file for complete search history.

(56) References Cited

U.S. PATENT DOCUMENTS

2004/0220714 A1\* 11/2004 Rudd, III ............ B60T 8/17616
701/71
2008/0154445 A1\* 6/2008 Goodman ............. B64C 25/426
701/3
(Continued)

FOREIGN PATENT DOCUMENTS

EP    3 296 170 A1    3/2018
EP    3 428 022 A1    1/2019
(Continued)

OTHER PUBLICATIONS

Preliminary French Search Report for Application No. 19 03459 dated Jan. 28, 2020.

*Primary Examiner* — Peter D Nolan
*Assistant Examiner* — Wae L Louie
(74) *Attorney, Agent, or Firm* — Sughrue Mion, PLLC

(57) ABSTRACT

An electric braking system (1) for braking an aircraft, the system comprising:
a brake (3) comprising an electromechanical actuator (5) designed so that when it applies a force to the friction members (4) that is less than or equal to a first maximum threshold, no degradation of the actuator occurs, and when it applies a force to the friction members (4) that is greater than the first maximum threshold, degradation is likely to occur;

(Continued)

control means (7) configurable to occupy a first mode in which the controlled braking force cannot exceed the first maximum threshold, and to occupy a second mode in which the controlled braking force can reach the second maximum threshold; and configuration means (10) arranged to configure the control means (7) to occupy the second mode when in a situation preceding a potential interruption of takeoff (RTO) of the aircraft, and otherwise to occupy the first mode.

15 Claims, 2 Drawing Sheets

(51) Int. Cl.
*B60T 8/32* (2006.01)
*B60T 13/74* (2006.01)
*B64C 25/44* (2006.01)

(56) References Cited

U.S. PATENT DOCUMENTS

| | | | |
|---|---|---|---|
| 2010/0274458 A1* | 10/2010 | Cahill | B60T 17/221 701/76 |
| 2011/0040466 A1* | 2/2011 | Hill | B60T 8/885 701/74 |
| 2015/0142217 A1* | 5/2015 | Metzger, Jr. | B60T 8/1703 701/3 |
| 2015/0142388 A1* | 5/2015 | Metzger | G08G 5/0021 702/189 |
| 2015/0344017 A1* | 12/2015 | Cahill | B60T 17/221 701/3 |
| 2018/0201367 A1* | 7/2018 | Georgin | B64C 25/46 |
| 2018/0326952 A1* | 11/2018 | Georgin | B60T 8/1761 |
| 2020/0307530 A1* | 10/2020 | Georgin | B60T 17/22 |
| 2020/0307531 A1* | 10/2020 | Richard | B60T 8/325 |
| 2022/0177119 A1* | 6/2022 | Cuesta Castro | B64C 25/44 |

FOREIGN PATENT DOCUMENTS

| | | |
|---|---|---|
| WO | 2007/084449 A2 | 7/2007 |
| WO | 2010/088396 A1 | 8/2010 |

* cited by examiner

[Fig. 1]
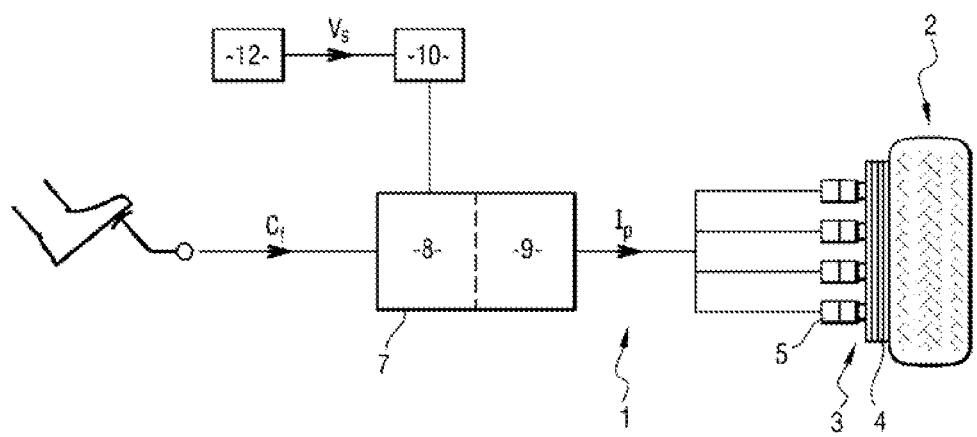
[Fig. 2]
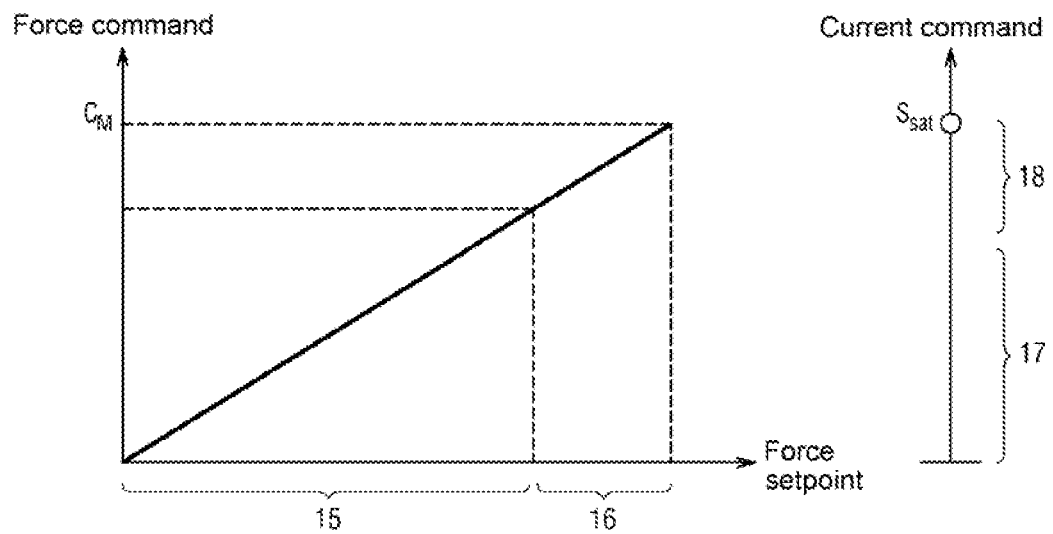

[FIG. 3]
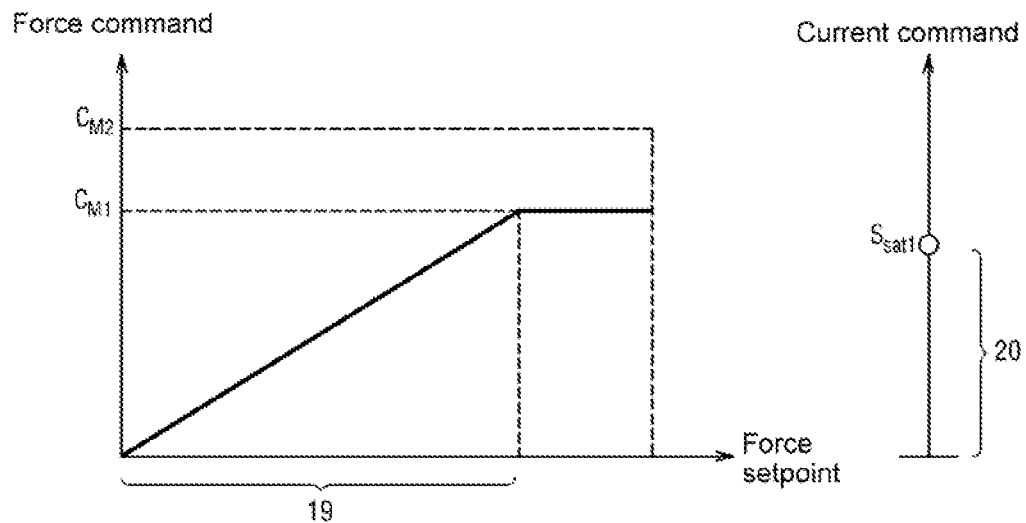
[Fig. 4]
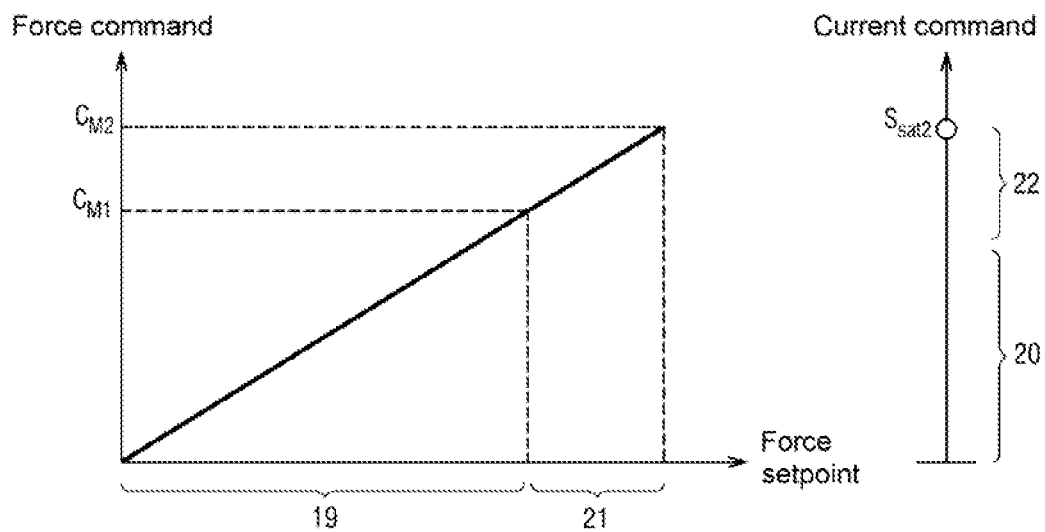

AIRCRAFT WHEEL BRAKING SYSTEM, CONFIGURABLE TO OCCUPY A NORMAL MODE OR AN RTO MODE

The invention relates to the field of electric braking systems for aircraft.

BACKGROUND OF THE INVENTION

An electric braking system for an aircraft includes brakes that are associated with so-called "braked" wheels of the aircraft.

The brake of a braked wheel includes friction members, e.g. a stack of disks, and electromechanical actuators mounted on an actuator carrier and arranged to apply a controlled braking force on the stack of disks in order to brake the wheel.

The electric braking system also includes control means that respond to a braking setpoint produced by a pilot of the aircraft or by an autopilot system by producing control currents for the electric motors of the electromechanical actuators. The control means comprise pieces of electrical equipment (control units, calculation means, controllers, etc.) and the number and the positions of these pieces of equipment in the aircraft depend on the number of braked wheels and on the architecture of the electric braking system, which may be centralized or distributed to a greater or lesser extent.

The electric braking system is used mainly for braking the aircraft when it is running along a runway on landing, while it is taxiing, and when parking the aircraft.

On landing and while taxiing, aircraft braking is controlled by a pilot using pedals in the cockpit. In order to provide parking braking, each electromechanical actuator of each brake has a parking braking member that enables the rotor of the electric motor of that electromechanical actuator to be blocked in position while a braking force is being exerted on the stack of disks.

On rare occasions, the electric braking system can also be used for interrupting a takeoff. An interrupted takeoff is generally referred to by the initials RTO (for rejected takeoff). An RTO consists in interrupting takeoff while the aircraft is on the ground and running along a runway in order to takeoff. The maximum ground speed of the aircraft at which it is possible to perform an RTO is written V1. Above the speed V1, it is no longer possible to interrupt takeoff.

An RTO is a situation that can be very severe for the brakes, since the brakes need to brake the aircraft while it is maximally loaded and running at a speed that may be considerable.

In particular, the electromechanical actuators needed to produce a braking force that is very high and they are therefore subjected to very high levels of stress.

The electromechanical actuators are designed to be capable of withstanding the stresses of an RTO. It is generally the situation of a maximum-energy RTO that defines the upper bound of the range of forces that can be applied on the brake by the electromechanical actuators.

The electromechanical actuators are therefore designed to be capable of producing a limiting operating force that corresponds to the situation of a maximum-energy RTO, and consequently they are relatively heavy and bulky.

The aircraft therefore permanently carries electromechanical actuators that are "over-dimensioned", i.e. that are large in weight and in size, so as to be ready for an event that is relatively rare and after which the electromechanical actuators are generally discarded.

OBJECT OF THE INVENTION

An object of the invention is to reduce the weight and the size of an aircraft electric braking system.

SUMMARY OF THE INVENTION

In order to achieve this object, there is provided an electric braking system for braking an aircraft wheel, the system comprising:

- a brake comprising friction members and at least one electromechanical actuator designed in such a manner that when it applies a controlled braking force on the friction members that is less than or equal to a first maximum threshold, no functional or structural degradation of the electromechanical actuator occurs, and when it applies a controlled braking force on the friction members that is greater than the first maximum threshold but less than or equal to a second maximum threshold, functional and/or structural degradation is likely to occur, but without preventing the electromechanical actuator from applying the controlled braking force; and
- control means arranged to produce a control current for powering an electric motor of the electromechanical actuator.

The control means are configurable to occupy a first mode, in which the control current is such that the controlled braking force cannot exceed the first maximum threshold, and to occupy a second mode in which the control current is such that the controlled braking force can reach the second maximum threshold.

The electric braking system further includes configuration means arranged to configure the control means to occupy the second mode when in a situation preceding a potential interruption of takeoff (RTO) of the aircraft, and otherwise to occupy the first mode.

Thus, when the control means are configured to occupy the first mode, which corresponds to normal braking, the electromechanical actuator is controlled to produce a controlled braking force that is less than or equal to the first maximum threshold. The controlled braking force is sufficient for normal braking and does not lead to any degradation of electromechanical actuator.

In contrast, when the control means are configured to occupy the second mode, which corresponds to an RTO situation, the electromechanical actuator is controlled to produce a controlled braking force that may be as great as the second maximum threshold. The controlled braking force makes it possible to perform a maximum-energy RTO. The electromechanical actuator might be degraded (while still ensuring that the braking is performed effectively), but this does not lead to a problem since, after the RTO, the electromechanical actuator needs to be inspected and might be discarded.

The electric braking system is thus optimized by adapting the dimensioning of the electromechanical actuator to its real use. A maximum-energy RTO no longer corresponds to a limiting operational force that the electromechanical actuator must be capable of producing normally, but rather to an ultimate force. Dimensioning in this way makes it possible to reduce the weight, the size, and the cost of the electromechanical actuator, and thus of the electric braking system, without degrading the performance of the electric braking system.

There is also provided an electric braking system as described above, in which the configuration means are arranged to configure the control means to occupy the second mode prior to each takeoff of the aircraft.

There is also provided an electric braking system as described above, in which the configuration means are arranged to configure the control means to occupy the second mode during each takeoff, whenever the ground speed of the aircraft exceeds a predetermined speed threshold.

There is also provided an electric braking system as described above, in which the configuration means are arranged to modify a braking relationship implemented in the control means in order to configure the control means.

There is also provided an electric braking system as described above, in which modification of the braking relationship consists in modifying parameters of the braking relationship, said parameters comprising a maximum command that limits a force command for controlling the electromechanical actuator, and a saturation threshold for a current command of the electric motor of the electromechanical actuator.

There is also provided an aircraft including an electric braking system as described above.

There is also provided a braking method performed in an electric braking system as described above, the method comprising the steps of:
  detecting whether the aircraft is or is not in a situation preceding a potential interruption of takeoff (RTO) of the aircraft;
  if the aircraft is not in such a situation, causing the control means to be configured by the configuration means to occupy the first mode; and
  if the aircraft is in such a situation, causing the control means to be configured by the configuration means to occupy the second mode.

The invention can be better understood in the light of the following description of a particular, nonlimiting embodiment of the invention.

BRIEF DESCRIPTION OF THE DRAWINGS

Reference is made to the accompanying drawings, in which:

FIG. 1 shows the electric braking system of the invention;

FIG. 2 applies to a prior art electric braking system and shows a first diagram plotting a curve giving the force command for an electromechanical actuator as a function of a force setpoint, and a second diagram showing current command levels for the motor of the electromechanical actuator as a function of the type of braking;

FIG. 3 shows diagrams that are similar to those of FIG. 2 but for an electric braking system of the invention with its control means configured to occupy a first mode; and FIG. 4 shows diagrams that are similar to those of FIG. 2 but for an electric braking system of the invention with its control means configured to occupy a second mode.

DETAILED DESCRIPTION OF THE INVENTION

With reference to FIG. 1, in this example the electric braking system 1 of the invention is integrated in an airplane and is used to brake braked wheels 2 of the airplane, and thus to brake the airplane itself.

The electric braking system 1 is configurable depending on the type of braking required, and more particularly depending on whether the required braking is normal braking, i.e. braking on landing, while the aircraft is taxiing, or for parking, or else braking for the purpose of interrupting a takeoff (RTO).

The electric braking system 1 comprises firstly a plurality of brakes 3, each brake 3 being associated with a braked wheel 2.

A brake 3 comprises friction members, specifically a stack of carbon disks 4, and a plurality of electromechanical actuators 5 carried by an actuator-carrier.

Each electromechanical actuator 5 comprises an electric motor and a pusher suitable for being moved by the electric motor to press against the stack of disks 4. The electromechanical actuator 5 is thus for the purpose of producing a controlled braking force on the stack of disks 4.

Each electromechanical actuator 5 is designed and dimensioned in a very particular manner that is specific to the invention.

Each electromechanical actuator 5 is designed in such a manner that, while applying a controlled braking force on the stack of disks 4 that is less than or equal to a first maximum threshold, no functional or structural degradation of the electromechanical actuator 5 occurs. This means firstly that the functional performance of the electromechanical actuator 5 after braking corresponds to its functional performance before braking.

The term "functional performance" is used to cover both the performance associated with the primary function of the electromechanical actuator 5, which is to produce a controlled braking force from a control current supplied to its electric motor, and also its performance in terms of reliability, lifetime, availability, continued ability to withstand external stresses, etc. This also means that braking does not produce any irreversible mechanical damage to the structure of any of the mechanical or electrical components of the electromechanical actuator 5.

The first maximum threshold is thus a limiting operational force that the electromechanical actuator 5 can generate while it is operating in a normal operating range. The normal operating range corresponds to normal braking, i.e. braking on landing, while taxiing, and in order to park the airplane.

In contrast, when the electromechanical actuator 5 applies a controlled braking force on the stack of disks 4 that is greater than the first maximum threshold but less than or equal to a second maximum threshold, functional and/or structural degradation is likely to occur, but without that preventing the electromechanical actuator 5 from applying the controlled braking force. The second maximum threshold corresponds to a maximum bound for the force that an electromechanical actuator 5 is capable of producing during braking for the purpose of interrupting a takeoff. The second maximum threshold makes it possible to perform a maximum-energy RTO.

The degradation has an impact that is "minor": the electromechanical actuator 5 does indeed produce the controlled braking force and makes it possible to perform the RTO, however, after braking, the electromechanical actuator 5 needs to be inspected and possibly discarded because of the degradation that it has suffered.

The second maximum threshold thus corresponds to an "ultimate" braking force of the electromechanical actuator 5.

Thus, during an RTO, the electromechanical actuator 5 produces a controlled braking force that may be as high as the second maximum threshold, and that runs the risk of damaging the electromechanical actuator 5. So long as the controlled braking force is less than or equal to the second maximum threshold, the electromechanical actuator 5 is capable of producing the controlled braking force in spite of any potential degradation, thereby guaranteeing that the airplane can perform the RTO cycle in full.

Dimensioning the brake in the manner described above makes it possible to reduce the weight, the size, and the cost of an electromechanical actuator 5 compared with a prior art electromechanical actuator that is designed to produce a limiting operational force that is equal to the second maximum threshold.

In particular, such dimensioning is based on "mechanical" specifications that are less demanding.

The acceptable and required elasticity limit for the mechanical components of the electromechanical actuator 5 is lower, thereby enabling their volume and their weight reduced.

The electric motor is also a potential source for optimization. It is possible to envisage reducing the volume of the electric motor. Specifically, in the event of a maximum-energy RTO, the electric motor is subjected to a very high level of heating. The electric motor needs to be of large volume in order to be capable of withstanding such heating without any degradation.

In this example, since some degradation is acceptable, it is possible to reduce the volume of the electric motor.

The electric braking system 1 also comprises control means 7. The control means 7 control one or more electromechanical actuators 5 positioned on one or more brakes 3.

The control means 7 comprise one or more pieces of electrical equipment in which there are implemented a control module 8 and a power module 9.

The control module 8 implements braking relationships comprising one or more servocontrol loops. In this example, the servocontrol loops comprise a force servocontrol loop (e.g. a torque servocontrol loop) and a current servocontrol loop. The power module 9 comprises one or more inverters for producing control currents for powering the electromechanical actuator(s) 5.

The control module 8 acquires a braking setpoint Cf that is produced by the pilot of the airplane acting on the pedals, for example.

Thereafter, the control module 8 converts the braking setpoint Cf into force setpoints, each for controlling a respective electromechanical actuator 5.

For each electromechanical actuator 5, the control module 8 transforms the force setpoint into a force command, which is itself converted into a current setpoint from which a current command is produced.

The power module 9 acquires the current command, and uses the current command and a power supply (taken from a power bus extending in the airplane) to generate a control current $I_p$ that is actually transmitted to the electric motor of the electromechanical actuator 5.

The control current $I_p$ controls the electromechanical actuator 5 so that each produces a controlled braking force.

The term "control current" is used to cover a direct current (DC) or an alternating current (AC), or indeed multi-phase AC.

The control means 7 are configurable in a first mode, in which the control current $I_p$ is such that the controlled braking force cannot exceed the first maximum threshold, and in a second mode in which the control current is such that the controlled braking force can reach the second maximum threshold.

The first mode is used for normal braking, and the second mode is used for braking having the purpose of interrupting a takeoff.

The configuration of the control means 7 is modified by modifying a braking relationship implemented in the control module 8 of the control means 7. Modifying the braking relationship consists in modifying the parameters of the braking relationship. These parameters comprise a maximum command that limits the force command for controlling the electromechanical actuator 5, and a saturation threshold for the current command.

Thus, the first mode is characterized by a first braking relationship defined by a first maximum command and by a first saturation threshold.

When the control means 7 are configured to occupy the first mode, the force command produced by the control module 8 from the braking setpoint is bounded by the first maximum command and therefore cannot exceed it.

The current command is saturated by the first saturation threshold. So long as the current command remains less than or equal to the first saturation pressure, any increase in the current command gives rise to an increase in the control current. When the current command reaches the first saturation threshold, the control current no longer increases.

The first saturation threshold ensures that a force command equal to the first maximum command can be reached but cannot be exceeded. The first saturation threshold serves to make control safe: even if the force command exceeds the first maximum command, the current command cannot exceed the first saturation threshold, such that the controlled braking force applied by the electromechanical actuator 5 cannot exceed the first maximum threshold.

Likewise, the second mode is characterized by a second braking relationship defined by a second maximum command and by a second saturation threshold. The second saturation threshold ensures that it is possible to reach a force command that is equal to the second maximum command.

The second maximum command is greater than the first maximum command, typically 10% to 30% greater, and preferably about 20% greater.

The electric braking system 1 also includes configuration means 10.

The configuration means 10 configure the control means 7 to occupy the second mode when in a situation preceding a potential introduction of an aircraft takeoff (RTO), and otherwise to occupy the first mode.

Provision can be made for the configuration means 10 to configure the control means 7 to occupy the second mode automatically prior to each takeoff of the airplane. Thus, at any moment during takeoff, a force command capable of reaching the second maximum command is available for braking the airplane.

Alternatively, provision can be made for the configuration means 10 to configure the control means 7 to occupy the second mode during takeoff of the airplane once the ground speed of the aircraft exceeds a predetermined speed threshold. In order to validate this condition, it is advantageous to make use of the ground speed $V_s$ of the airplane as measured by an inertial unit 12 of the airplane, since such measurement is more accurate and more reliable than a speed measured by tachometers fitted to the braked wheels 2.

Whenever a force command greater than the first maximum command threshold is produced by the control means 7, it should be observed that, a maintenance message is generated. The maintenance message indicates that RTO has just taken place and that the electromechanical actuator 5 needs to be inspected. The electromechanical actuator 5 is inspected, and if necessary it is discarded. In contrast, so long as the first maximum command is not exceeded, no inspection is needed.

The above description is illustrated with reference to the diagrams of FIGS. 2 to 4.

FIG. 2 relates to a prior art electric braking system.

Only one braking relationship is used. The force command increases whenever the force setpoint increases. The force command is limited by a single maximum command $C_M$. The current command is saturated by a single saturation threshold $S_{sat}$ that enables the controlled braking force produced by the electromechanical actuator to reach the maximum command $C_M$ without exceeding it.

The total range bounding the force setpoint comprises a nominal range 15, plus an additional range 16 provided for an RTO situation.

Since the additional range 16 corresponds to a force command that is less than or equal to the single maximum command $C_M$, this entire range is accessible to the pilot whatever the kind of braking.

Likewise, the total range bounding the current setpoint comprises a nominal range 17, plus an additional range 18 provided for an RTO situation.

During nominal braking, the single saturation threshold $S_{sat}$ therefore does not prevent there being a current command that corresponds to the additional range 18 provided for an RTO situation.

Thus, during normal braking, the pilot can cause a braking force to be applied that lies in a force range intended for an RTO situation, which is pointless and runs the risk of prematurely damaging the brakes. Furthermore, the electromechanical actuators need to be over-dimensioned, since they need to be capable, without damage, of producing a controlled braking force that corresponds to the maximum command $C_M$ (and thus to a maximum-energy RTO), after which they would generally be discarded.

FIG. 3 relates to the electric braking system 1 of the invention when the control means 7 are configured to occupy the first mode.

It can be seen that the force command is limited to the first maximum command $C_{M1}$, and that the current command is limited to the first saturation threshold $S_{sat1}$.

During normal braking, even if the force setpoint goes beyond the nominal range of 19, the force command cannot go beyond the first maximum command $C_{M1}$. The current command cannot exceed the nominal range 20 because of the first saturation threshold $S_{sat1}$.

Thus, when not in an RTO situation, both the force command for controlling an electromechanical actuator 5 and also the current command are set in compliance with the braking performance required for normal braking, i.e. braking on landing, braking while taxiing, or braking for parking the airplane. Thus, during normal braking, the pilot can no longer cause a braking force to be applied in a force range designed for an RTO situation.

FIG. 4 relates to the electric braking system 1 of the invention when the control means 7 are configured to occupy the second mode.

In preparation for a potential RTO, the upper bound of the force command is raised so as to reach the second maximum command $C_{M2}$ and the control current limit is raised so that the current command can reach the second saturation threshold $S_{sat2}$.

During an RTO, when the force setpoint reaches the additional range 21, the force command continues to increase and can reach the second maximum command $C_{M2}$. The current command can reach the additional range 22.

Under such circumstances, the pilot can cause a braking force to be applied that reaches the second maximum command $C_{M2}$, thereby enabling the pilot to brake the airplane in the event of a maximum-energy RTO.

Naturally, the invention is not limited to the embodiment described, but covers any variant coming within the ambit of the invention as defined by the claims.

The architecture of the electric braking system as described above is relatively simple. It is clear that the control means may be implemented in one or more pieces of electrical equipment and in any type of architecture. The control module and the power module may form parts of a single piece of electrical equipment, but that is not essential. The configuration means may form part of the same piece of electrical equipment as the control means, or they may be integrated in the control means (they may comprise a portion of the software implemented in the control means), but that is not essential.

The invention claimed is:

1. An electric braking system for braking an aircraft wheel, the electric braking system comprising:
   a brake comprising friction members and at least one electromechanical actuator designed in such a manner that when the at least one electromechanical actuator applies a controlled braking force on the friction members that is less than or equal to a first maximum threshold, no functional or structural degradation of the at least one electromechanical actuator occurs, and when the at least one electromechanical actuator applies a controlled braking force on the friction members that is greater than the first maximum threshold but less than or equal to a second maximum threshold, functional and/or structural degradation is likely to occur, but without preventing the at least one electromechanical actuator from applying the controlled braking force; and
   a first controller arranged to produce a control current for powering an electric motor of the at least one electromechanical actuator,
   wherein the first controller is configured to operate in one of a first mode in which the control current is such that the controlled braking force cannot exceed the first maximum threshold, and a second mode in which the control current is such that the controlled braking force can reach the second maximum threshold, and
   wherein the electric braking system includes a second controller arranged to configure the first controller to operate in the second mode when in a situation preceding a potential interruption of takeoff (RTO) of an aircraft, and otherwise to operate in the first mode.

2. The electric braking system according to claim 1, wherein the second controller is arranged to configure the first controller to operate in the second mode prior to each takeoff of the aircraft.

3. The electric braking system according to claim 1, wherein the second controller is arranged to configure the first controller to operate in the second mode during each takeoff, whenever a ground speed of the aircraft exceeds a speed threshold.

4. The electric braking system according to claim 1, wherein the second controller is arranged to modify a braking relationship implemented in the first controller in order to configure the first controller.

5. The electric braking system according to claim 4, wherein modification of the braking relationship comprises modifying parameters of the braking relationship, said parameters comprising a maximum command that limits a force command for controlling the at least one electromechanical actuator, and a saturation threshold for a current command of the electric motor of the at least one electromechanical actuator.

6. An aircraft including the electric braking system according to claim 1.

7. A braking method performed in the electric braking system according to claim 1, the method comprising:
  detecting whether the aircraft is or is not in the situation preceding a potential interruption of takeoff (RTO) of the aircraft;
  if the aircraft is not in the situation, causing the first controller to operate in the first mode; and
  if the aircraft is in the situation, causing the first contoller to operate in the second mode.

8. The electric braking system according to claim 1, wherein in the second mode, the control current is such that the controlled braking force is between the first maximum threshold and the second maximum threshold.

9. The electric braking system according to claim 1, wherein in the second mode, the control current is such that the controlled braking force can exceed the first maximum threshold and can reach the second maximum threshold.

10. The electric braking system according to claim 1, wherein the second controller comprises the first controller.

11. The electric braking system according to claim 1, wherein the second controller is separate from the first controller.

12. The electric braking system according to claim 1, wherein the first controller is implemented by one or more pieces of electrical equipment.

13. The electric braking system according to claim 12, wherein the second controller forms part of the one or more pieces of electrical equipment.

14. The electric braking system according to claim 12, wherein the second controller is implemented by the same one or more pieces of electrical equipment as the first controller.

15. The electric braking system according to claim 12, wherein the second controller is implemented by one or more pieces of electrical equipment that are different than the one or more pieces of electrical equipment that implement the first controller.

* * * * *